(12) United States Patent
Blumhofer et al.

(10) Patent No.: US 8,018,456 B2
(45) Date of Patent: Sep. 13, 2011

(54) SMOOTH GRAY-LEVEL BASED SURFACE INTERPOLATION FOR AN ISOTROPIC DATA SETS

(75) Inventors: Andreas Blumhofer, Neubiberg (DE); Corinna Seltz, Munich (DE)

(73) Assignee: Brainlab AG, Feldkirchen (DE)

( * ) Notice: Subject to any disclaimer, the term of this patent is extended or adjusted under 35 U.S.C. 154(b) by 998 days.

(21) Appl. No.: 11/875,050

(22) Filed: Oct. 19, 2007

(65) Prior Publication Data
US 2008/0259072 A1    Oct. 23, 2008

Related U.S. Application Data

(60) Provisional application No. 60/862,875, filed on Oct. 25, 2006.

(30) Foreign Application Priority Data

Oct. 19, 2006 (EP) .................................. 06021947

(51) Int. Cl.
*G06T 15/30* (2011.01)
(52) U.S. Cl. ........ 345/423; 345/419; 345/420; 345/421; 345/424; 345/426; 345/427; 345/442; 378/68; 378/69; 382/128; 382/203; 382/285
(58) Field of Classification Search .......... 345/419–421, 345/423, 426, 427, 442; 378/68, 69, 901; 382/128
See application file for complete search history.

(56) References Cited

U.S. PATENT DOCUMENTS

| | | | |
|---|---|---|---|
| 4,977,505 A | 12/1990 | Pelizzari et al. | |
| 5,633,951 A | 5/1997 | Moshfeghi | |
| 6,040,835 A * | 3/2000 | Gibson | ......................... 345/424 |
| 6,115,048 A | 9/2000 | Cline et al. | |
| 6,476,803 B1 * | 11/2002 | Zhang et al. | ................... 345/419 |
| 6,496,608 B1 | 12/2002 | Chui | |
| 6,694,057 B1 * | 2/2004 | Miller et al. | ................... 382/203 |
| 7,194,117 B2 * | 3/2007 | Kaufman et al. | ............. 382/128 |
| 7,324,104 B1 * | 1/2008 | Bitter et al. | ..................... 345/420 |
| 7,376,252 B2 * | 5/2008 | Gritzky et al. | ................. 382/128 |
| 7,474,776 B2 * | 1/2009 | Kaufman et al. | ............. 382/128 |
| 7,474,803 B2 * | 1/2009 | Petrov et al. | .................... 382/285 |
| 7,477,768 B2 * | 1/2009 | Kaufman et al. | ............. 382/128 |
| 7,486,811 B2 * | 2/2009 | Kaufman et al. | ............. 382/128 |
| 7,538,764 B2 * | 5/2009 | Salomie | ........................ 345/420 |
| 2003/0190091 A1 | 10/2003 | Stewart | |
| 2005/0091016 A1 | 4/2005 | Godavarthy et al. | |

FOREIGN PATENT DOCUMENTS

EP    1 184 812    3/2002

OTHER PUBLICATIONS

Durikovic et al., "Shape-Based Calculation and Visualisation of General Cross-sections through Biological Data", IEEE Comput. Soc., Aug. 1997, pp. 2-9.

(Continued)

*Primary Examiner* — Kimbinh T Nguyen
(74) *Attorney, Agent, or Firm* — Renner, Otto, Boisselle & Sklar, LLP

(57) ABSTRACT

A method of determining a distance of a source point to a surface of an object in three-dimensional space, wherein the object is represented by a decision rule and a plurality of volume elements arranged in slices comprising rows and columns, wherein each volume element carries at least one value, and wherein the decision rule determines membership of each volume element to the object in accordance with the at least one value of the volume element, the method comprising: determining a contour of a representation of the object within each slice; locating on the contour of each slice a homing point closest to the source point; fitting a curve to the located homing points; determining a distance from the source point to the fitted curve; and equating the determined distance as the distance of the source point to the surface of the object.

25 Claims, 4 Drawing Sheets

OTHER PUBLICATIONS

Jones et al., "A New Approach to the Construction of Surfaces from Contour Data", Computer Graphics Forum UK, vol. 13, No. 3, 1994, pp. C/75-C/84.

Pelizzari et al., "Registration of Multiple MRI Scans by Matching Bony Surfaces", Proceedings of the Annual International Conference of the Engineering in Medicine and Biology Society, Paris, IEEE, vol. 5, Oct.-Nov. 1, 1992, pp. 1972-1973.

Yan et al., "Image Registration of MR and PET Based on Surface Matching and Principal Axes Fitting", vol. 4, 1994, pp. 1677-1681.

* cited by examiner

SMOOTH GRAY-LEVEL BASED SURFACE INTERPOLATION FOR AN ISOTROPIC DATA SETS

RELATED APPLICATION DATA

This application claims priority of U.S. Provisional Application No. 60/862,875 filed on Oct. 25, 2006, which is incorporated herein by reference in its entirety.

FIELD OF THE INVENTION

The present invention relates generally to methods of three-dimensional surface reconstruction and modeling and, more particularly, to methods and apparatus for closest point location and surface registration in three-dimensional space.

BACKGROUND OF THE INVENTION

Surface reconstruction from imaging data acquired in serial sections or slices of a three-dimensional object constitutes a prerequisite to many medical image processing tasks and applications. A three-dimensional object may be represented by a decision rule and a plurality of volume elements (voxels) piled up in slices comprising rows and columns. Each voxel carries at least one value, preferably an intensity level. The decision rule determines the membership of each voxel to an object in accordance with the at least one value of the voxel. A decision rule for determining the membership of a voxel in a plurality of voxels to a three-dimensional object may comprise a threshold at or above which a voxel is considered to be a member of the object.

Three-dimensional objects comprising a decision rule and a plurality of voxels may be acquired from computed tomography (CT), single photon emission computed tomography (SPECT) or positron emission tomography (PET) scans, or from magnetic resonance imaging (MRI).

Once the membership of each voxel to an object is determined, a surface of the object representation may be obtained by interpolating the slice data. Surface interpolation techniques can be broadly divided into gray-level based interpolation techniques and shape based interpolation techniques.

Gray-level based interpolation, in general, first determines intensity values in intermediate voxel positions by interpolating between adjacent or near voxels to obtain an interpolated intensity value or gray-value. Then, a decision rule is applied to determine object membership of the respective intermediate voxel positions.

In U.S. Pat. No. 6,496,608, Chui describes an image data interpolation method for filling in undefined values in intermediate positions of two-dimensional imaging data.

Gray level based interpolation techniques tend to produce aliasing effects resulting in jagged surface representations. Gray level based interpolation techniques therefore do not appear to be appropriate in applications requiring smooth surface representations, such as surface matching, for instance.

Shape based interpolation in general first extracts object information from slice data by applying a decision rule and obtaining an object representation as binary or discrete volume element or voxel data, for instance. Subsequently the object information is used to guide an interpolation process.

An example of shape-based interpolation is distance field interpolation. The slice data is converted to binary image data using a threshold. Then, a distance transformation is applied to these image data. Distance transformations are described, for example, in Danielsson P.-E., Euclidean Distance Mapping, Computer Graphics and Image Processing, 14, 227-248 (1980). The distance transformation results in a dataset wherein each picture element or pixel contains the distance of that pixel to the surface within the slice. The distance transformed dataset is then linearly interpolated, for instance, between the slices and thresholded at a distance value of zero to obtain interpolated contour or slice points.

The terms pixel and voxel for picture elements and volume elements, respectively, are used interchangeably. Both terms describe elements of planar imaging data which may, particularly in the case of voxels, originate from a slice of a volumetric, three-dimensional object representation.

A disadvantage of the distance field interpolation may be seen in the fact that the resulting interpolated slice also comprises binary image data, i.e., gray value information is lost. Therefore, no sub-pixel accuracy can be achieved using distance field interpolation.

In US patent application 20050091016, Godavarthy et al. describe a method to interpolate or smooth surface points in a triangulated irregular network (TIN).

In EP 1 184 812 A1, Hutter describes a method to smooth unisotropic data sets. In an unisotropic data set slices of an object representation, for instance, are irregularly spaced.

In US patent application number 20030190091A1, Steward describes an iterative method for performing image registration adapted to map features on a first image to corresponding features in a second image.

In U.S. Pat. No. 6,115,048, Cline et al. describe a method for creating or displaying three-dimensional surfaces represented by volume elements tested against a threshold, the surface normal vectors of which may be determined using values of adjacent voxels.

Other commonly used methods for three-dimensional surface reconstruction of medical slice data sets include the "marching squares" and the "marching cubes" algorithms, respectively. A "marching squares" algorithm for generating contour lines from voxels on a contour of a planar slice of a three-dimensional object is described in Maple, C. Geometric Design and Space Planning Using the Marching Squares and Marching Cube Algorithms, International Conference on Geometric Modeling and Graphics (GMAG'03): 90-95, 2003.

Voxels may be considered as being on a contour of an object if they belong to the object and if they are adjacent to at least one voxel that does not belong to the object. A "marching cubes" algorithm that also generates contour lines from voxels of a three-dimensional object but considers voxels in a three-dimensional neighborhood of a contour voxel to determine a surface description of an object by creating a triangulation of the surface of the object is described in Lorensen, W. E. and Cline, H. E. Marching Cubes: A High Resultion 3D Surface Construction Algorithm, Computer Graphics, 21(4): 163_169, 1987.

The smoothness of a surface description resulting from the marching squares or marching cubes algorithm depends on the resolution of the triangulation that has been used. Accurate distance measurement, closest point location, and registration of source points to a target surface are essential methods in surface matching used for medical patient registration.

Surface matching is especially critical if the distance between the slices of a data set is much larger than the voxel or pixel size of the single slices, i.e., the data set may be anisotropic. What is needed is to find a way to interpolate between these slices without creating jagged surfaces, which would prevent a surface matching method from converting to a global minimum.

SUMMARY OF THE INVENTION

The present invention provides a method and apparatus that locates closest surface points by using a smoothed surface as a basis. In contrast to conventional surface matching methods, the method and apparatus do not get stuck in local minima, for instance, choosing a smooth or smoothed surface description. By combining gray-value based interpolation with shape-based interpolation of a data set, the method and apparatus enable local extraction of a smoothed surface from possibly anistropic slice data sets. As a result, the gray-value information of an object representation is preserved and the shape of the surface between slices of the object is observed.

A method of determining a distance of a source point to a surface of an object in three-dimensional space, wherein the object may be represented by a decision rule and plurality of volume elements (referred to as voxels) arranged in slices comprising rows and columns, each voxel carrying at least one value, and the decision rule determining a membership of each voxel to the object in accordance with the at least one value of the voxel, may comprise:

determining a contour of the object representation within each slice;

locating on the contour of each slice a homing point closest to the source point;

fitting a curve to the located homing points; and determining a distance from the source point to the fitted curve as the distance to the surface of the object.

A method of locating, relative to a source point, a closest target point on a surface of an object in three-dimensional space, wherein the object may be represented by a decision rule and plurality of volume elements (referred to as voxels) arranged in slices comprising rows and columns, each voxel carrying at least one value, and the decision rule determining the membership of each voxel to the object in accordance with the at least one value of the voxel, may comprise:

determining a contour of the object representation within each slice;

locating on the contour of each slice a homing point closest to the source point;

fitting a curve to the located homing points; and determining a point on the fitted curve closest to the source point as the closest target point.

A method of registering a plurality of source points to a surface of an object in three-dimensional space, wherein the object may be represented by a decision rule and plurality of volume elements, referred to as voxels, arranged in slices comprising rows and columns, each voxel carrying at least one value, and the decision rule determining the membership of each voxel to the object in accordance with the at least one value of the voxel, may comprise:

determining a contour of the object representation within each slice;

determining a target point for each of the plurality of source points; and adjusting the plurality of source points to the corresponding target points, wherein the step of determining a target point for each of the plurality of source points comprises for each one of the plurality of source points:

locating on the contour of each slice a homing point closest to the source point;

fitting a curve to the located homing points closest to the one source point; and determining a point on the fitted curve closest to the one source point as a target point.

An apparatus for determining a distance of a source point to a surface of an object in three-dimensional space, wherein the object may be represented by a decision rule and plurality of volume elements, referred to as voxels, arranged in slices comprising rows and columns, each voxel carrying at least one value, and the decision rule determining the membership of each voxel to the object in accordance with the at least one value of the voxel, may comprise:

a first device for determining a contour of the object representation within each slice;

a second device for locating on the contour of each slice a homing point closest to the source point;

a third device for fitting a curve to the located homing points; and a fourth device for determining a distance from the source point to the fitted curve as the distance to the surface of the object.

An apparatus for locating, relative to a source point, a closest target point on a surface of an object in three-dimensional space, wherein the object may be represented by a decision rule and plurality of volume elements, referred to as voxels, arranged in slices comprising rows and columns, each voxel carrying at least one value, and the decision rule determining the membership of each voxel to the object in accordance with the at least one value of the voxel, may comprise:

a first device for determining a contour of the object representation within each slice;

a second device for locating on the contour of each slice a homing point closest to the source point;

a third device for fitting a curve to the located homing points; and a fourth device for determining a point on the fitted curve closest to the source point as the closest target point.

An apparatus for registering a plurality of source points to a surface of an object in three-dimensional space, wherein the object may be represented by a decision rule and plurality of volume elements, referred to as voxels, arranged in slices comprising rows and columns, each voxel carrying at least one value, and the decision rule determining the membership of each voxel to the object in accordance with the at least one value of the voxel, may comprise:

a first device for determining a contour of the object representation within each slice;

a second device for determining a target point for each of the plurality of source points; and a third device for adjusting the plurality of source points to the corresponding target points, wherein the second device for determining a target point for each of the plurality of source points comprises:

a fourth device for locating on the contour of each slice a homing point closest to a source point;

a fifth device for fitting a curve to the located homing points closest to the source point; and a sixth device for determining a point on the fitted curve closest to the source point as a target point.

In the method and apparatus, adjusting the plurality of source points to the corresponding target points may comprise:

transforming the position and/or orientation, referred to as pose, of the plurality of source points to a pose that reduces a predetermined cost function related to the plurality of source points and the corresponding target points.

In the method and apparatus, the transformation may comprise a rigid body transformation and/or cost function related to the plurality of source points as a distance function.

In the method and apparatus, the distance between the slices may exceed the distance between rows or the distance between columns representing the object in three-dimensional space and/or the slices of the object representation may be irregularly spaced.

In the method and apparatus, the decision rule may comprise testing a value derived from the at least one value of a voxel against a predetermined threshold and/or the at least one value of a voxel may comprise at least one intensity value.

In the method and apparatus, locating on a contour of a slice a homing point closest to a source point may comprise: interpolating between positions of two nearest voxels and/or the at least one value of two nearest voxels or computing a gradient of the at least one value of two nearest voxels and to interpolate the gradient.

In the method and apparatus, at least one source point and/or the object representation may be related to a respective body portion or body portions of a patient.

In the method and apparatus, the plurality of volume elements may be obtained from imaging the object using ultrasound, computed tomography (CT), single photon emission computed tomography (SPECT), or positron emission tomography (PET), or magnetic resonance (MR).

The methods described herein may be used for navigating in the presence of a first object represented by a plurality of source points and a second object represented by a plurality of volume elements and a decision rule and/or for collision avoidance between the first object and the second object.

The method described herein may be carried out by a computer program executed on a general purpose computer, a dedicated computer or a computer on a chip (SOC). Further, a computer may be caused by a computer program to function as the apparatus described herein.

The computer program for executing the method and/or the computer program causing a computer function according to the apparatus may be stored on a computer-readable data carrier.

BRIEF DESCRIPTION OF THE DRAWINGS

The forgoing and other features of the invention are herein after discussed with reference to the drawing.

DETAILED DESCRIPTION

Surface matching is a method often used for medical patient registration. In surface matching, point locations may be acquired intraoperatively on the patient, for example on the spinal column, the femur or the skin. Point locations then can be matched onto the surface, which is extracted from a patient data set by defining a gray-value threshold, for instance a bone threshold or a skin threshold designating a bone surface and a skin surface, respectively.

Surface matching provides a rigid body transformation from a reference coordinate system to a patient coordinate system used for patient registration. Surface matching often comprises finding the closest surface point or target point for each acquired point and performing a point-to-point match for each acquired point location. Preferably, the method of locating, relative to a source point, a closest target point on a surface of an object is used to find the closest target point. The method is explained in more detail below. The points then can be transformed with the determined transformation and the process can be repeated until the points are within a predetermined distance of the surface of the object. This means that the closest surface points of the transformed point locations are found and a point-to-point match can be again carried out to obtain a new transformation; these steps may be repeated until a stop criterion is reached. The localization of the closest surface point of an object may be seen as an important and time-consuming part of a surface matching process and is often required to be accurate and fast.

Figure 1A:
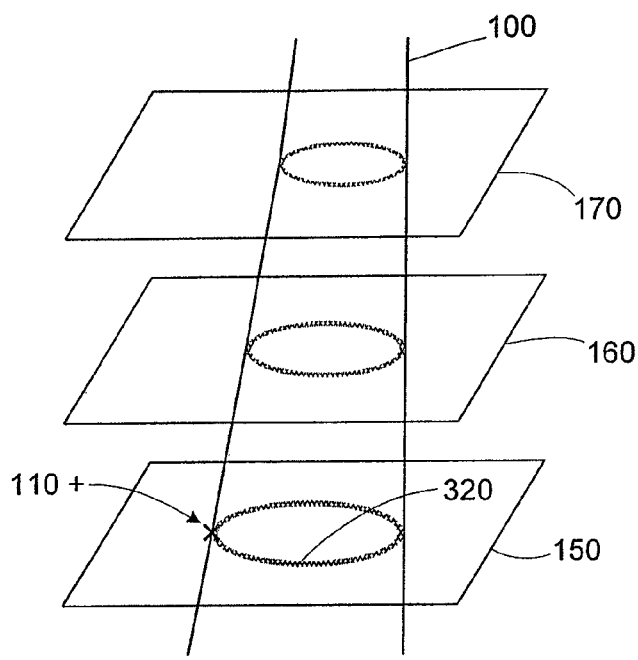
FIGS. 1a-1d are schematic representations of an exemplary method of determining a distance of a source point to a surface of an object in accordance with the invention, and an exemplary method of locating, relative to a source point, a closest target point on a surface of an object in three-dimensional space in accordance with the invention.

FIGS. 1a-1d illustrate an exemplary method for determining a distance of a source point to a surface of an object in accordance with the invention, and an exemplary method of locating, relative to a source point, a closest target point on a surface of an object in three-dimensional space in accordance with the invention. FIG. 1a shows a portion of a patient's spinal column as a three-dimensional object 100 and a source point 110 for which a distance to the surface of the object 100 or a closest target point on the surface of the object 100 is to be found. The object 100 is represented by a decision rule comprising a gray-value threshold and a plurality of slices 140 (not shown in FIG. 1a), 150, 160, and 170 comprising volume elements or voxels arranged in rows and columns (not shown). Within each slice 140, 150, 160 and 170, a contour 320 of the object representation is determined. A method for contour line determination is described below.

Figure 1B:
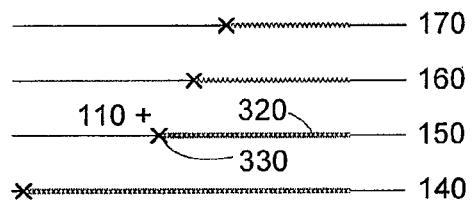
Figure 1C:
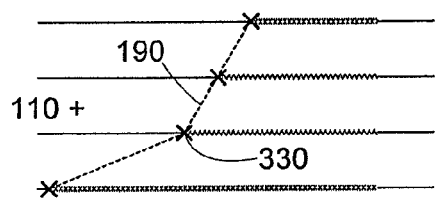
Figure 1D:
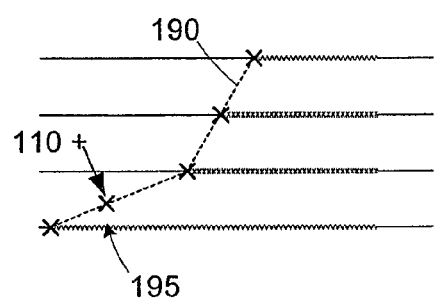

Subsequently, as illustrated in FIG. 1b, on the contour 320 of each slice 150, 160 and 170 a closest point 330 to the source point 110 is located as a homing point. Then, as depicted in FIG. 1c, a curve 190 is fit to the homing points located on the contour 320 of each slice 150, 160 and 170. Fitting a curve 190 to the located homing points may comprise fitting piecewise linear functions or cubic splines or other splines or higher order curves to the located homing points. As illustrated in FIG. 1d, with the fitted curve 190, a distance from the source point 110 to the fitted curve can be determined as the distance to the surface of the object 100, and a point 195 on the fitted curve closest to the source point 110 can be determined as the closest target point, respectively.

With the method and apparatus for locating, relative to a source point, a closest target point on a surface of an object in three-dimensional space, a smooth interpolation between the slices of a medical data set is achieved and the closest surface points can be located even between slices of an anisotropic data set. To find a closest point or homing point on a slice surface for a given source point, the source point can be projected onto the respective slice. Then, the nearest voxel or pixel can be determined, which is a gray-value greater than or equal to a predetermined threshold and which has at least one neighbor pixel that has a gray-value below that threshold. Using the gray-value information within the slice, the closest slice surface point or homing point may be computed with sub-pixel accuracy. This process results in a precise, smooth, local surface description.

The method and apparatus for accurately locating a closest target point on the surface of an object relative a source point also finds a closest surface point for medical, anisotropic slice data.

The slice surface points can be determined with sub-pixel accuracy using a marching squares algorithm. The marching squares algorithm computes surface contour lines within slices and is a two-dimensional version of the marching cubes algorithm, which is commonly used for the three-dimensional visualization of medical data. The basic idea of the marching squares algorithm is that a surface contour has to pass between a pixel that is above a predetermined threshold and a neighboring or adjacent pixel that is below that threshold. The exact position of the contour points can be obtained by linearly interpolating the gray values between two pixels. It is also possible to compute the gray value gradient for an identified nearest pixel and to interpolate linearly along this gradient in order to determine the exact or sub-pixel position of the surface point within a slice.

Figure 3:
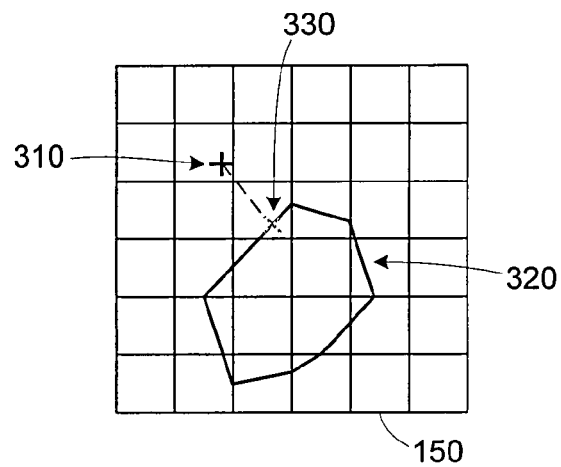
FIG. 3 is a projection onto one slice of an object illustrating an exemplary determination of a closest surface point or homing point in accordance with the invention.

FIG. 3 is a projection onto one slice of an object showing a projection of the given source point onto a slice 150 and a contour line 320 of the given object determined, for example, by a marching squares algorithm. With the contour line 320, a closest slice surface point 330 or homing point may be determined with sub-pixel accuracy.

Figure 2:
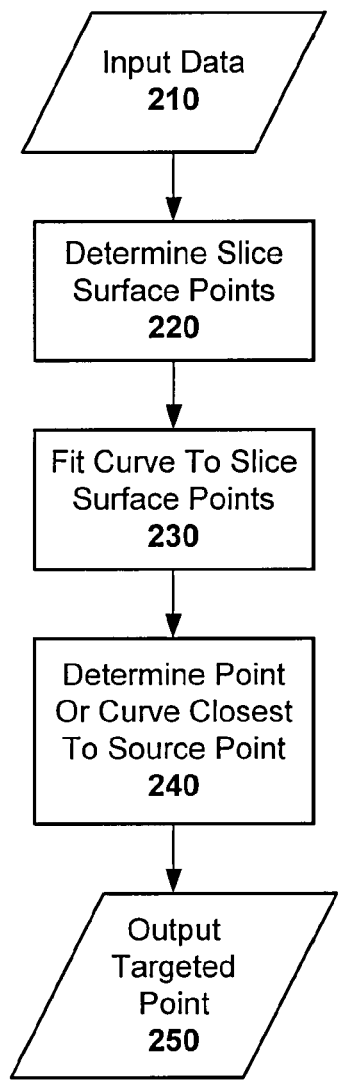
FIG. 2 is a general flow-chart of an exemplary method for locating, relative to a source point, a closest target point on a surface on object in three-dimensional space in accordance with the invention.

Referring now to FIG. 2, a flow diagram shows the general principle used in an exemplary method and apparatus in accordance with the invention for locating, relative to a source point, a closest target point on a surface on object in three-dimensional space. In step 210 a slice data set, which may be an anisotropic slice data set, a threshold defining a surface of an object, and the coordinates of a source point in a predetermined coordinate system, respectively, are received as input.

In step 220 slice surface points are determined by projecting the source point onto neighboring slices and then the closest slice surface point or homing point within each slice is determined with sub-pixel accuracy as described.

In step 230 a piecewise linear function, for instance, is fit to the slice surface points or homing points 330 determined in step 220. In step 240, a point on the fitted curve closest to the source point is determined as the closest target point 195. This point is output in step 250 as the closest target point 195 on the surface of an object represented by the input data.

Figure 4:
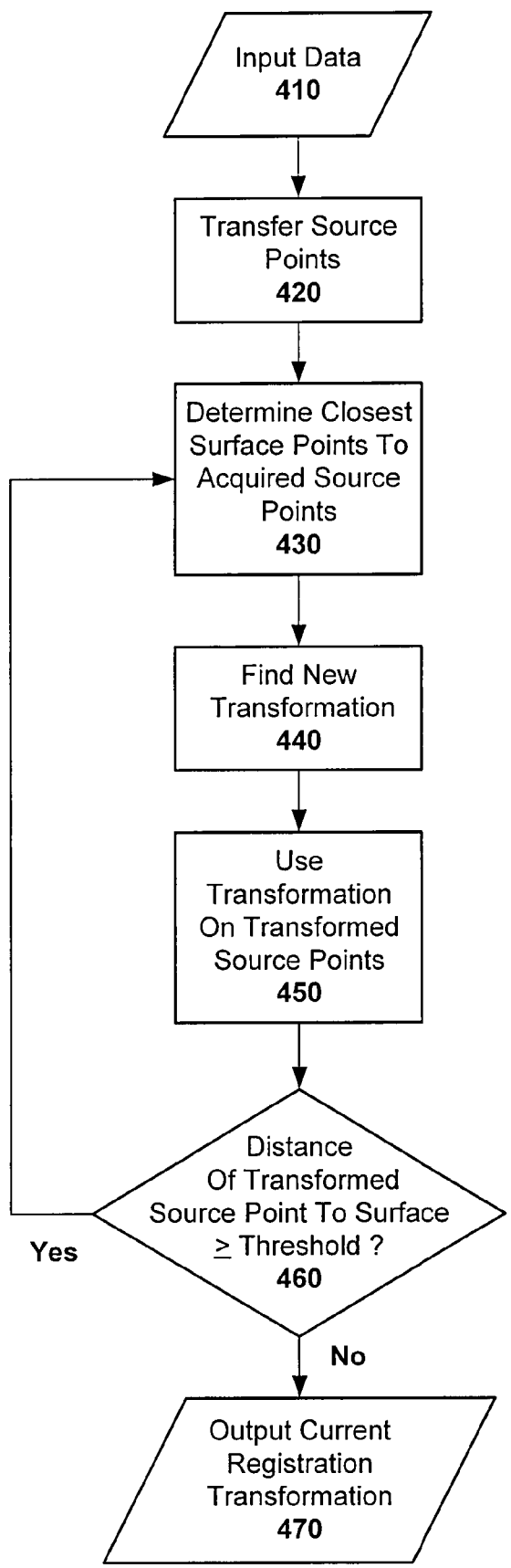
FIG. 4 is a general flow-chart of an exemplary method for registering a plurality of source points to a surface of an object in three-dimensional space in accordance with the invention.

Tuning now to FIG. 4, a flow diagram is provided showing a general principle used in the method and apparatus for registering a plurality of source points to a surface of an object in three-dimensional space. In step 410, a slice dataset, which may be an anisotropic slice dataset, a threshold defining a surface of an object represented by the slice dataset, a plurality of source points which are acquired intraoperatively, for instance, and an initial coordinate transformation to transform the plurality of acquired source points within a predetermined coordinate system are received as input. In step 420, the initial transformation or pre-registration is used to transform the acquired source points to respective transformed locations.

Reference is made to FIG. 2 and the preceding page of this description, wherein the processing of step 430 is explained in further detail. In step 430, the closest surface points or homing points 330 to the acquired source points are found by determining a contour of the object representation within each slice and determining a target point for each of the plurality of source points, wherein the determination of a target point for each of the plurality of source point comprises for each one of the plurality of source points: locating on the contour of each slice a homing point 330 closest to the source point, fitting a curve to the located homing points, and determining a point on the fitted curve closest to the one source point as a target point.

In step 440 a new transformation is found that reduces or minimizes the distance between the source points and the closest surface points or target points. In step 450 the plurality of the transformed source points is again transformed with the transform determined in step 440.

In step 460 it is determined whether the distance of the transformed source points to the surface represented by the input threshold and slice data set, respectively, is equal to or exceeds a predetermined threshold. If so, processing is resumed in step 430, otherwise, if the distance falls below the predetermined threshold in step 470 the current registration transformation is output as a result.

Figure 5:
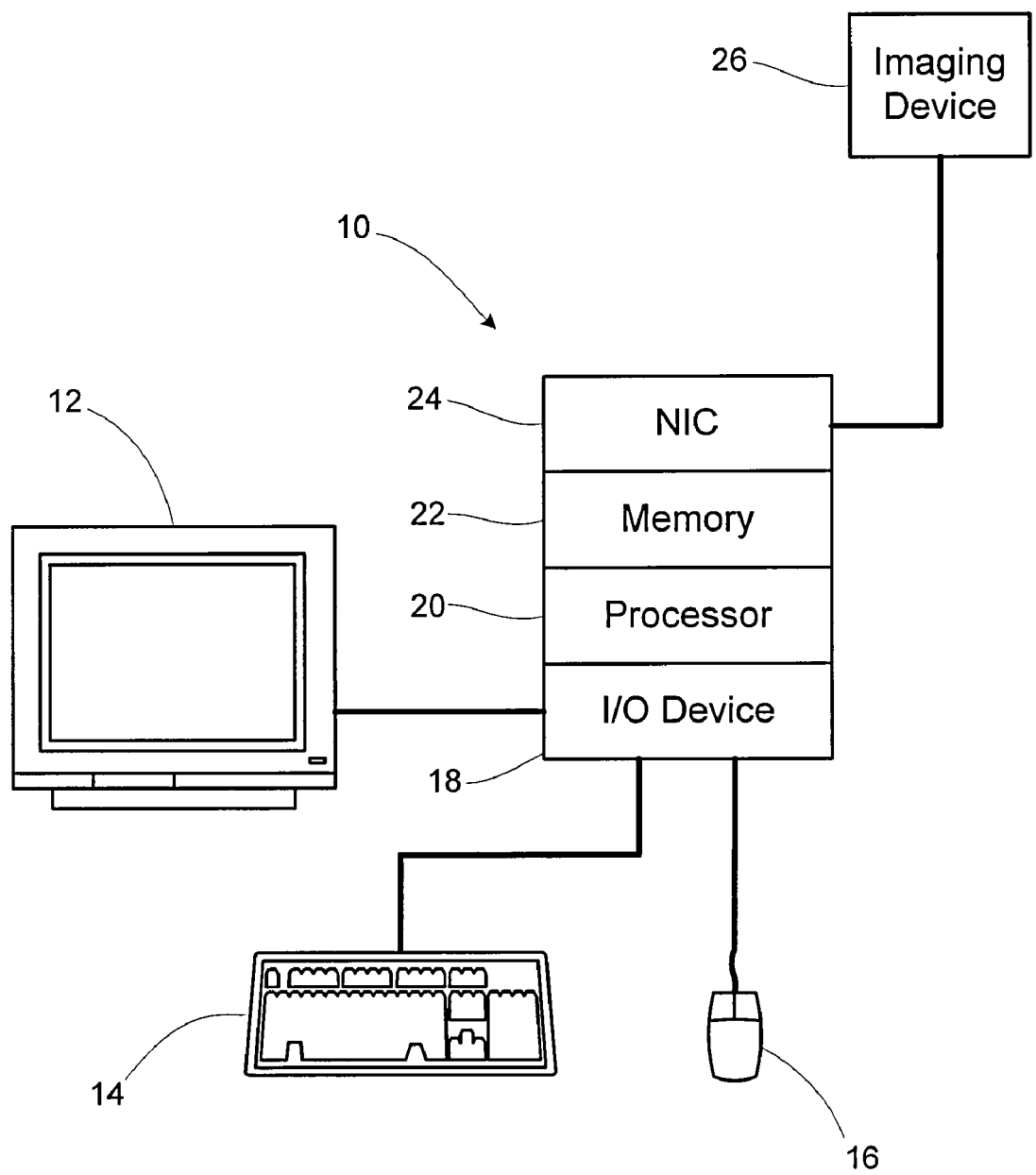
FIG. 5 is a block diagram of an exemplary computer system that may be used to carry out one or more of the methods described herein.

Moving now to FIG. 5 there is shown a block diagram of an exemplary computer 10 that may be used to implement one or more of the methods described herein. The computer 10 may include a display 12 for viewing system information, and a keyboard 14 and pointing device 16 for data entry, screen navigation, etc. A computer mouse or other device that points to or otherwise identifies a location, action, etc., e.g., by a point and click method or some other method, are examples of a pointing device 16. Alternatively, a touch screen (not shown) may be used in place of the keyboard 14 and pointing device 16. The display 12, keyboard 14 and mouse 16 communicate with a processor via an input/output device 18, such as a video card and/or serial port (e.g., a USB port or the like).

A processor 20, such as an AMD Athlon 64® processor or an Intel Pentium IV® processor, combined with a memory 22 execute programs to perform various functions, such as data entry, numerical calculations, screen display, system setup, etc. The memory 22 may comprise several devices, including volatile and non-volatile memory components. Accordingly, the memory 22 may include, for example, random access memory (RAM), read-only memory (ROM), hard disks, floppy disks, optical disks (e.g., CDs and DVDs), tapes, flash devices and/or other memory components, plus associated drives, players and/or readers for the memory devices. The processor 20 and the memory 22 are coupled using a local interface (not shown). The local interface may be, for example, a data bus with accompanying control bus, a network, or other subsystem.

The memory may form part of a storage medium for storing information, such as application data, screen information, programs, etc., part of which may be in the form of a database. The storage medium may be a hard drive, for example, or any other storage means that can retain data, including other magnetic and/or optical storage devices. A network interface card (NIC) 24 allows the computer 10 to communicate with other devices.

An imaging device 26, such as an ultrasound device, a computed tomography (CT) device, single photon emission computed tomography (SPECT) device, a positron emission tomography (PET) device, or magnetic resonance (MR) device can be communicatively coupled to the processor 20 via the NIC 24, for example.

A person having ordinary skill in the art of computer programming and applications of programming for computer systems would be able in view of the description provided herein to program a computer 10 to operate and to carry out the functions described herein. Accordingly, details as to the specific programming code have been omitted for the sake of brevity. Also, while software in the memory 22 or in some other memory of the computer and/or server may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of determining a distance of a source point to a surface of an object in three-dimensional space, wherein the object is represented by a decision rule and a plurality of volume elements arranged in slices comprising rows and columns, wherein each volume element carries at least one value, and wherein the decision rule determines membership of each volume element to the object in accordance with the at least one value of the volume element, the method comprising:
   determining a contour of a representation of the object within each slice;
   locating on the contour of each slice a homing point closest to the source point;
   fitting a curve to the located homing points;
   determining, using a processor, a distance from the source point to the fitted curve; and
   equating the determined distance from the source point to the fitted curve as the distance of the source point to the surface of the object.

2. The method according to claim 1, wherein the slices of the object representation are irregularly spaced, or a distance between slices exceeds a distance between rows or a distance between columns, wherein said rows and columns at least partially represent the object in three-dimensional space.

3. The method according to claim 1, wherein the decision rule comprises testing a value derived from at least one value of a volume element against a predetermined threshold, and/or wherein the at least one value of the volume element comprises at least one intensity value.

4. The method according to claim 1, wherein locating on the contour of each slice a homing point closest to the source point includes interpolating between positions of two nearest volume elements and/or the at least one value of two nearest volume elements and/or using a gradient of the at least one value of the two nearest volume elements.

5. The method according to claim 1, wherein the source point and/or the object representation are related to a respective body portion or body portions of a patient.

6. The method according to claim 1, further comprising obtaining the plurality of volume elements from imaging the object using ultrasound, computed tomography (CT), single photon emission computed tomography (SPECT), positron emission tomography (PET), or magnetic resonance (MR).

7. The method according to claim 1, wherein locating on the contour of each slice a homing point closest to the source point includes projecting the source point onto the respective slice.

8. A method of locating, relative to a source point, a closest target point on a surface of an object in three-dimensional space, wherein the object is represented by a decision rule and plurality of volume elements arranged in slices comprising rows and columns, wherein each volume element carries at least one value, and wherein the decision rule determines membership of each volume element to the object in accordance with the at least one value of the volume element, the method comprising:
   determining a contour of a representation of the object within each slice;
   locating on the contour of each slice a homing point closest to the source point;
   fitting a curve to the located homing points; and
   identifying, using a processor, a point on the fitted curve closest to the source point as the closest target point.

9. The method according to claim 8, further comprising:
   determining for a plurality of source points respective target points; and
   adjusting the plurality of source points to the corresponding target points, wherein determining for the plurality of source points respective target points includes
   a) locating on the contour of each slice a homing point closest to the source point;
   b) fitting a curve to the located homing points closes to one source point; and
   c) determining a distance from the source point to the fitted curve; and
   d) equating the determined distance from the source point to the fitted curve as a respective target point, thereby registering the plurality of source points to the surface of the object in three dimensional space.

10. The method according to claim 9, wherein adjusting the plurality of source points to the corresponding target points includes transforming the position and/or orientation of the plurality of source points to a position and/or orientation that reduces a predetermined cost function related to the plurality of source points and the corresponding target points.

11. The method according to claim 10, wherein transforming the position and/or orientation includes a rigid body transformation and/or the cost function to the plurality of source points as a distance function.

12. The method according to claim 9, further comprising using the registration data to perform at least one of
medical navigation in the presence of a first object represented by a plurality of source points and a second object represented by a plurality of volume elements and a decision rule, or
for collision avoidance between the first object and the second object.

13. The method according to claim 8, wherein locating on the contour of each slice a homing point closest to the source point includes projecting the source point onto the respective slice.

14. An apparatus for determining a distance of a source point to a surface of an object in three-dimensional space, wherein the object is represented by a decision rule and a plurality of volume elements arranged in slices comprising rows and columns, wherein each volume element carries at least one value, and wherein the decision rule determines membership of each volume element to the object in accordance with the at least one value of the volume element, the apparatus comprising:
a processor and memory;
logic stored in memory and executable by the processor, said logic comprising
logic for determining a contour of a representation of the object within each slice;
logic for locating on the contour of each slice a homing point closest to the source point;
logic for fitting a curve to the located homing points;
logic for determining a distance from the source point to the fitted curve; and
logic for equating the determined distance from the source point to the fitted curve as the distance to the surface of the object.

15. An apparatus for locating, relative to a source point, a closest target point on a surface of an object in three-dimensional space, wherein the object is represented by a decision rule and a plurality of volume elements arranged in slices comprising rows and columns, wherein each volume element carries at least one value, and wherein the decision rule determines membership of each volume element to the object in accordance with the at least one value of the volume element, the apparatus comprising:
a processor and memory;
logic stored in memory and executable by the processor, said logic comprising
logic for determining a contour of a representation of the object within each slice;
logic for locating on the contour of each slice a homing point closest to the source point;
logic for fitting a curve to the located homing points; and
logic for determining a point on the fitted curve closest to the source point as the closest target point.

16. An apparatus for registering a plurality of source points to a surface of an object in three-dimensional space, wherein the object is represented by a decision rule and a plurality of volume elements arranged in slices comprising rows and columns, wherein each volume element carries at least one value, and the decision rule determining the membership of each volume element to the object in accordance with the at least one value of the volume element, the apparatus comprising:
a processor and memory;
logic stored in memory and executable by the processor, said logic comprising
logic for determining a contour of a representation of the object within each slice;
logic for determining a target point for each of the plurality of source points; and
logic for adjusting the plurality of source points to the corresponding target points;
wherein the logic for determining a target point for each of the plurality of source points comprises:
logic for locating on the contour of each slice a homing point closest to a source point;
logic for fitting a curve to the located homing points closest to the source point; and
logic for determining a point on the fitted curve closest to the source point as a target point.

17. The apparatus according to claim 16, wherein the logic for adjusting the plurality of source points to the corresponding target points comprises logic for transforming the position and/or orientation of the plurality of source points to a position and/or orientation that reduces a predetermined cost function related to the plurality of source points and the corresponding target points.

18. The apparatus according to claim 17, wherein the logic for transforming the position further includes logic that implements a rigid body transformation and/or logic that relates the cost function to the plurality of source points as a distance function.

19. The apparatus according to claim 14, wherein the slices of the object representation are irregularly spaced, or where a distance between the slices exceeds a distance between rows or a distance between columns representing the object in three-dimensional space.

20. The apparatus according to claim 14, wherein the decision rule comprises testing a value derived from the at least one value of a volume element against a predetermined threshold and/or wherein the at least one value of a volume element comprises at least one intensity value.

21. The apparatus according to claim 14, wherein logic that locates on the contour of a slice a homing point closest to a source point includes logic that interpolates between positions of two nearest volume elements and/or the at least one value of two nearest volume elements or logic that uses a gradient of the at least one value of two nearest volume elements.

22. The apparatus according to claim 14, wherein at least one source point and/or the object representation are related to a respective body portion or body portions of a patient.

23. The apparatus according to claim 14, further comprising at least one of an imaging device, and ultrasound device, a computed tomography (CT) device, single photon emission computed tomography (SPECT) device, a positron emission tomography (PET) device, or magnetic resonance (MR) device communicatively coupled to said processor for obtaining data relating to the plurality of volume elements.

24. The apparatus according to claim 14, wherein logic for locating on the contour of each slice a homing point closest to the source point includes logic that projects the source point onto the respective slice.

25. The apparatus according to claim 15, wherein logic for locating on the contour of each slice a homing point closest to the source point includes logic that projects the source point onto the respective slice.

* * * * *